United States Patent [19]

Gasbarro

[11] Patent Number: 4,557,017
[45] Date of Patent: Dec. 10, 1985

[54] APPARATUS FOR FILLETING MEAT FROM POULTRY BREAST SECTIONS

[76] Inventor: Geno N. Gasbarro, 1305 Noe Bixby Rd., Columbus, Ohio 43227

[21] Appl. No.: 548,346

[22] Filed: Nov. 3, 1983

Related U.S. Application Data

[63] Continuation-in-part of Ser. No. 421,814, Sep. 23, 1982, abandoned, which is a continuation of Ser. No. 281,788, Jul. 10, 1981, abandoned.

[51] Int. Cl.$^4$ .................... A22C 17/04; A22C 21/00
[52] U.S. Cl. ........................................ 17/11; 17/1 G; 17/46
[58] Field of Search ............... 17/11, 1 G, 46, 56

[56] References Cited

U.S. PATENT DOCUMENTS

| | | | |
|---|---|---|---|
| 2,793,392 | 5/1957 | Cutrera | 17/46 X |
| 3,321,801 | 5/1967 | Westerdahl | 17/46 X |
| 3,347,680 | 10/1967 | Rambold | 17/46 |
| 3,348,261 | 10/1967 | Segur | 17/11 X |
| 4,037,294 | 7/1977 | Cowie et al. | 17/56 |
| 4,402,112 | 9/1983 | Gasbarro | 17/11 |

Primary Examiner—Willie G. Abercrombie
Attorney, Agent, or Firm—Francis T. Kremblas, Jr.

[57] ABSTRACT

An apparatus and method for deboning or filleting the meat from a poultry breast section which is characterized by a plurality of mandrels spaced along a moving endless chain conveyor and each adapted to receive a poultry breast section. After loading of the mandrel, it is advanced to a cutting station comprising a pair of closely spaced stationary knives disposed parallel to the direction of travel. The knives effect a longitudinal cut of predetermined depth closely adjacent to the length of the keel or center bone of the breast section to create a loose flap of meat. The mandrel and breast section continue to be advanced to a meat stripping section which comprises a pair of lateral spaced resilient strips which form a downwardly inclined path. As the breast section engages the strip in a predetermined manner, the meat portion on each side of the breast is peeled from the bone as the breast advances through the stripping section. The meat fillet is collected separately from the remaining bone portion.

4 Claims, 11 Drawing Figures

APPARATUS FOR FILLETING MEAT FROM POULTRY BREAST SECTIONS

This application is a continuation-in-part of my copending application Ser. No. 421,814, filed on Sept. 23, 1982, which in turn is a continuation of my earlier filed application Ser. No. 281,788 filed on July 10, 1981, both now abandoned.

BACKGROUND OF THE INVENTION

For several years there has been an increasing trend in the poultry industry to automate various processing of the poultry carcass in an effort to reduce time and labor costs. Examples of machines of this type include the following patents:

U.S. Pat. No. 3,233,282 issued 2/8/66;
U.S. Pat. No. 3,564,644 issued 2/23/73;
U.S. Pat. No. 3,930,282 issued 1/6/76;
U.S. Pat. No. 4,184,229 issued 1/22/80;
U.S. Pat. No. 4,016,624 issued 4/12/77;
U.S. Pat. No. 2,766,477 issued 1/21/53; and
U.S. Pat. No. 4,083,083 issued 4/11/78.

None of these prior references, however, deal with the problem of mechanically filleting the meat portion from a breast section of a poultry product. The poultry industry, in general, and particularly that segment supplying the fast food industry presently relies upon manual filleting of breast sections to supply the poultry meat fillets to customers. Applicant is not aware of any prior automatic, mechanical apparatus or method which separate the meat from the breast section in such a satisfactory manner to warrant the elimination of the conventional manual operations.

SUMMARY OF THE INVENTION

An automated deboning or filleting apparatus and method for poultry breast sections which comprises a plurality of mandrels, each adapted to receive a poultry breast section and mounted in spaced relationship on an endless chain for movement between a loading station and a filleting or deboning station. The mandrels are shaped to receive an individual breast section with the outer meat portion facing inwardly. After loading of a breast section on the mandrel, it advances into engagement with a retaining guide means just prior to passing into engagement with a pair of stationary knives which effect a cut the length of the breast section closely adjacent to the keel or center breast bone. The mandrel carrying the breast is then advanced to a stripping section which effects removal of the meat portion from the bone portion. The stripping section includes a pair of inclined laterally spaced, resilient strips which engage the loose flap of the meat portion created by the cutting of the knife means adjacent to the keel bone. The resilient strips form an inclined opening of predetermined spacing and literally peels the meat cleanly from the underlying breast bone as the mandrel advances along the stripping section. The remaining bone portion is removed at a downstream position for separate collection prior to the mandrel returning to the original loading position.

OBJECTS

It is therefore an object of the present invention to provide an apparatus and method for automated, mechanical filleting of the meat portion from poultry breast sections in a fast and efficient manner.

It is another object of the present invention to provide an apparatus and method of the type described which permits an increase in production up to five or six times the output of an operator using the conventional manual methods.

It is another object of the present invention to provide an apparatus of the type described which is relatively simple in construction with few moving parts to reduce maintenance and increase reliability and which does not require a highly skilled operator.

It is a further object of the present invention to provide an apparatus of the type described which permits consistently high yields from either skinned or unskinned breast sections.

It is still another object of the present invention to provide an apparatus and method of the type described which increases the safety of the operator to greatly lessen worker injuries.

Further objects and advantages of the present invention will be apparent from the following description, reference being had to the accompanying drawings wherein a preferred form of embodiment of the invention is clearly shown.

IN THE DRAWINGS

DETAILED DESCRIPTION

Figure 1:
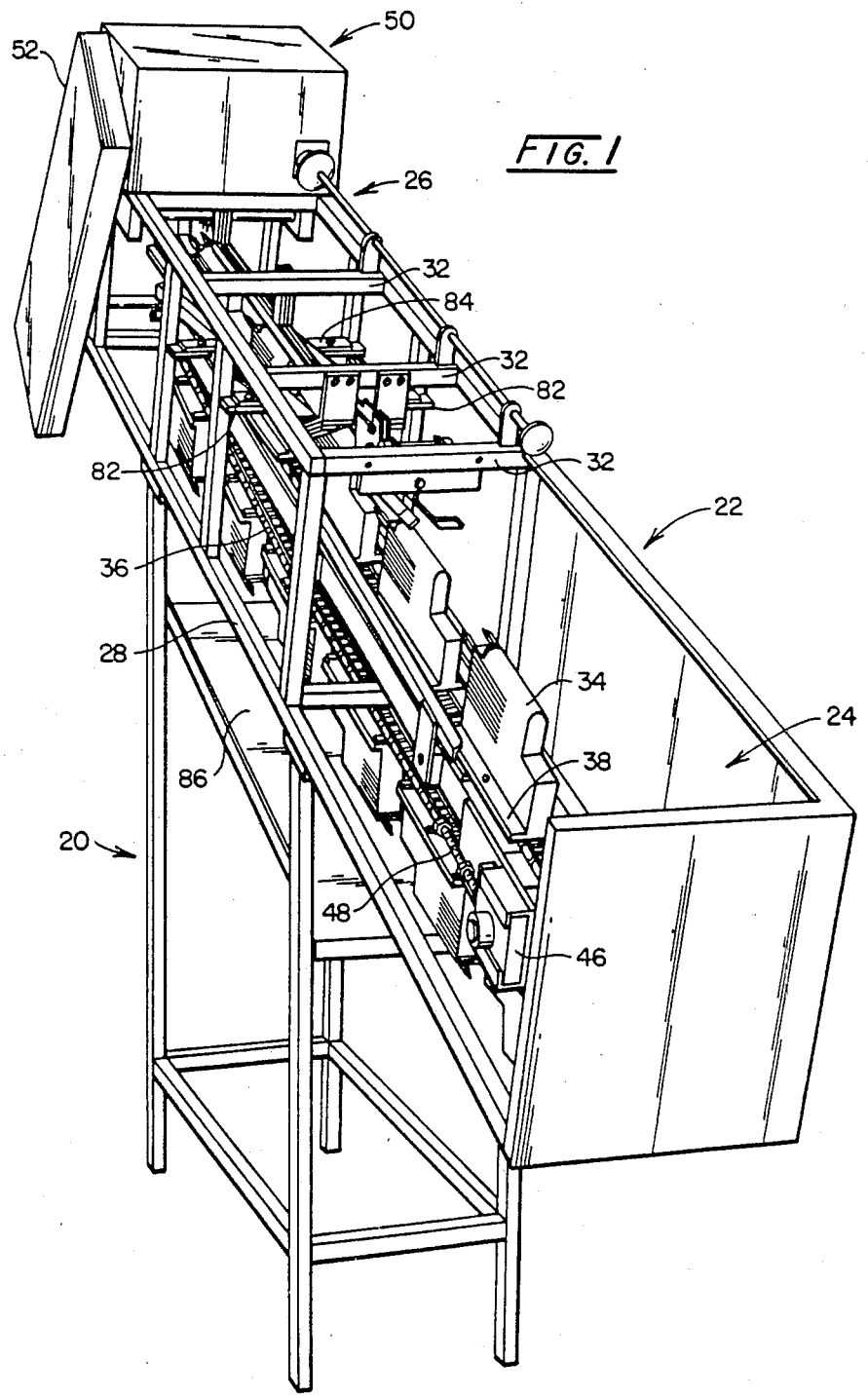
FIG. 1 is a perspective view of an apparatus for automatically and mechanically filleting the meat from a pre-cut poultry breast section constructed in accordance with the present invention.

An apparatus for automatically filleting the meat portion from the bone portions of a pre-cut poultry breast section constructed in accordance with the present invention is illustrated in FIG. 1. As used herein, the term poultry includes chicken, turkey, duck or geese and any other forms of fowl.

The apparatus shown in FIG. 1 includes a base means, indicated generally at 20, which supports an elongated upper frame section indicated generally at 22.

Frame means 22 is disposed generally at an upwardly inclined position from the loading station indicated generally at 24 to the discharge end, indicated generally at 26.

Frame means 22 includes lower support members 28 extending the full length of the apparatus and upper support members 30. A plurality of vertical and horizontal frame members 32 provide additional stability and means for mounting other components to the frame as described later in detail herein.

Figure 2:
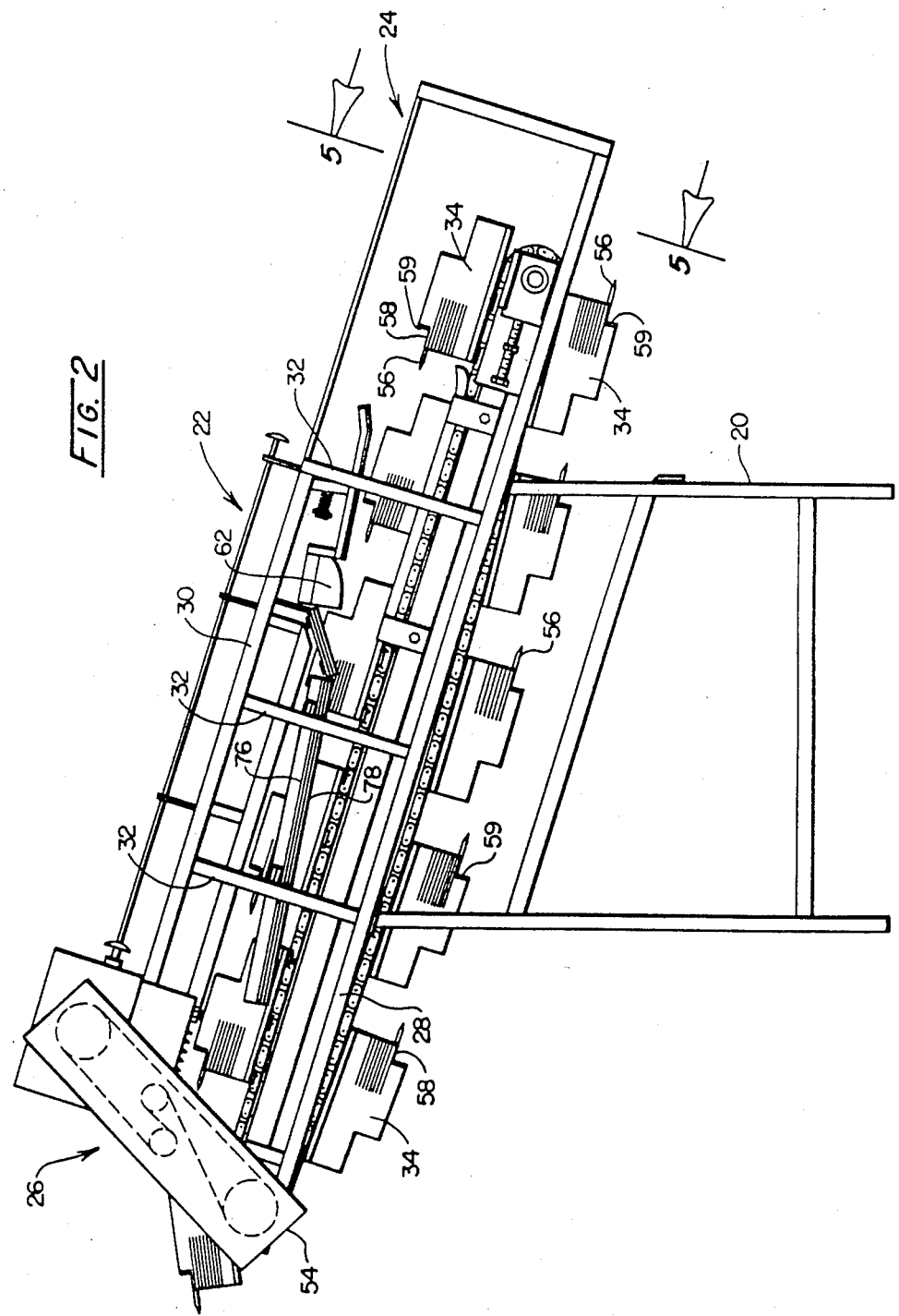
FIG. 2 is a side elevational view of the apparatus shown in FIG. 1.
Figure 4:
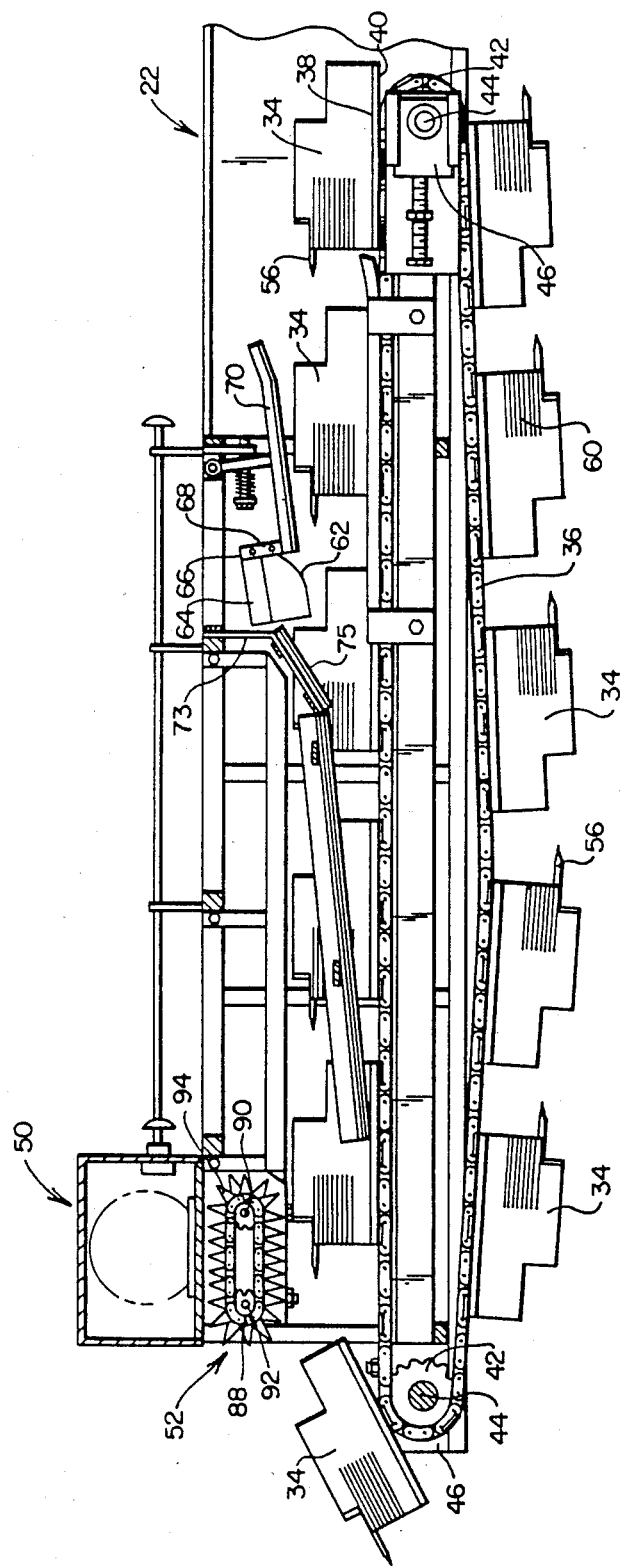
FIG. 4 is a partial side elevational view of the apparatus shown in FIG. 1, illustrating an enlargement of a portion of the apparatus.
Figure 5:
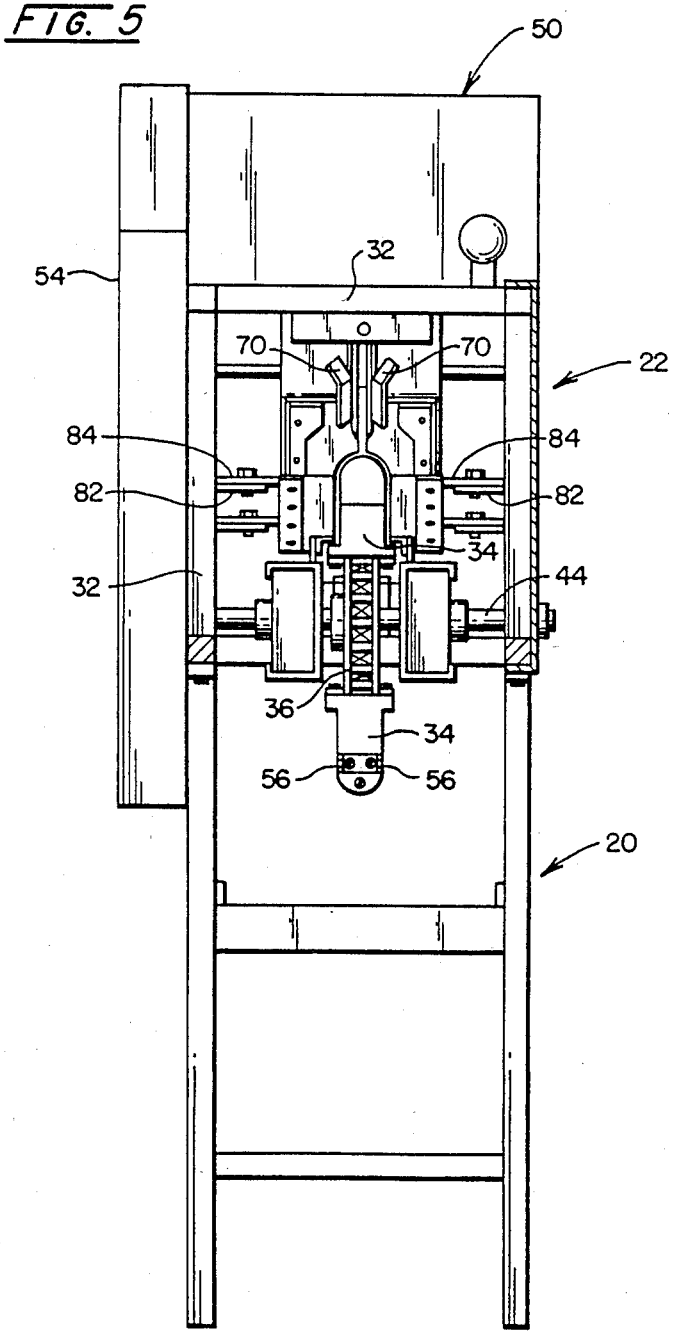
FIG. 5 is an end sectional view of the apparatus shown in FIG. 2, the section being taken along line 5—5 in FIG. 2.
Figure 8:
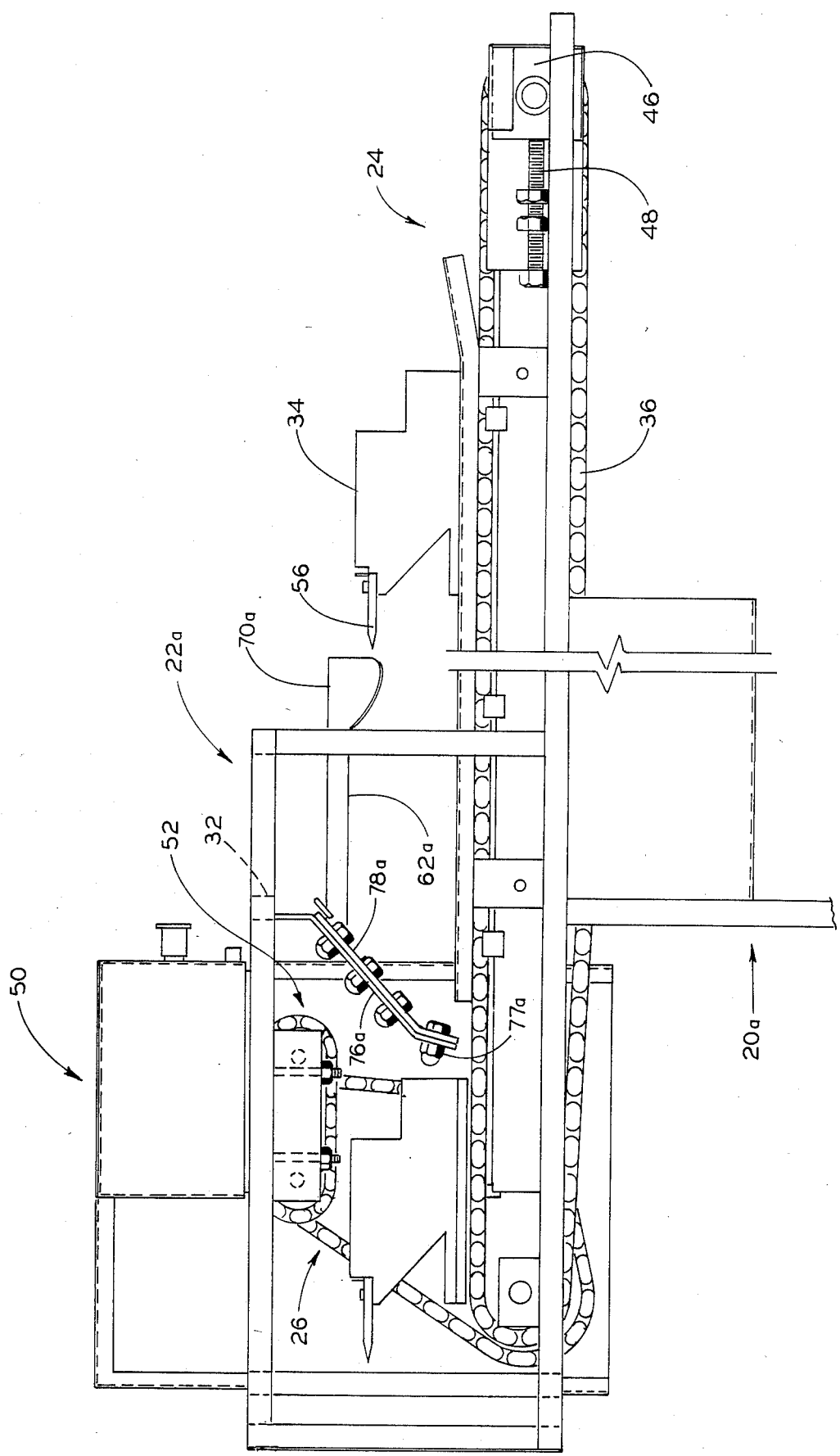
FIG. 8 is a side elevational view of another embodiment of the apparatus shown in FIG. 1 constructed in accordance with the present invention.

As best seen in FIGS. 1, 2 and 4, a plurality of breast retaining mandrels 34 are fixedly mounted to an endless chain 36 in spaced relationship to one another for continuous, repetitive advancement along a predetermined path in frame means 22.

Each mandrel 34 includes a pair of flange portion 38 on each side which are bolted to a plate 40, which in turn may be connected to chain 36 in any conventional manner.

Chain 36 is mounted on a conventional sprocket 42 at each end of the frame. Each sprocket 42 is mounted on a suitable shaft 44 rotatably carried in a bearing block 46. An adjustable bolt 48 is threadably mounted to a portion of frame 22 and may be employed to adjust the tautness of endless chain 36.

A conventional electric motor, indicated generally at 50, including a driven shaft operatively connected to shaft 44 at the terminal end of frame 22 may be employed to drive chain 36. Any conventional driving means and sprocket arrangement may be employed for this purpose and may also be used to drive the bone discharging apparatus, indicated generally at 52, as is well-known in the art. Therefore a detailed description is unnecessary as alone the driving mechanism forms no portion of the novel aspects of the present invention. The shield 54 is employed to isolate the drive chain and sprocket arrangement from the remainder of the apparatus and from water or cleaning agents used in cleaning the apparatus.

Figure 3:
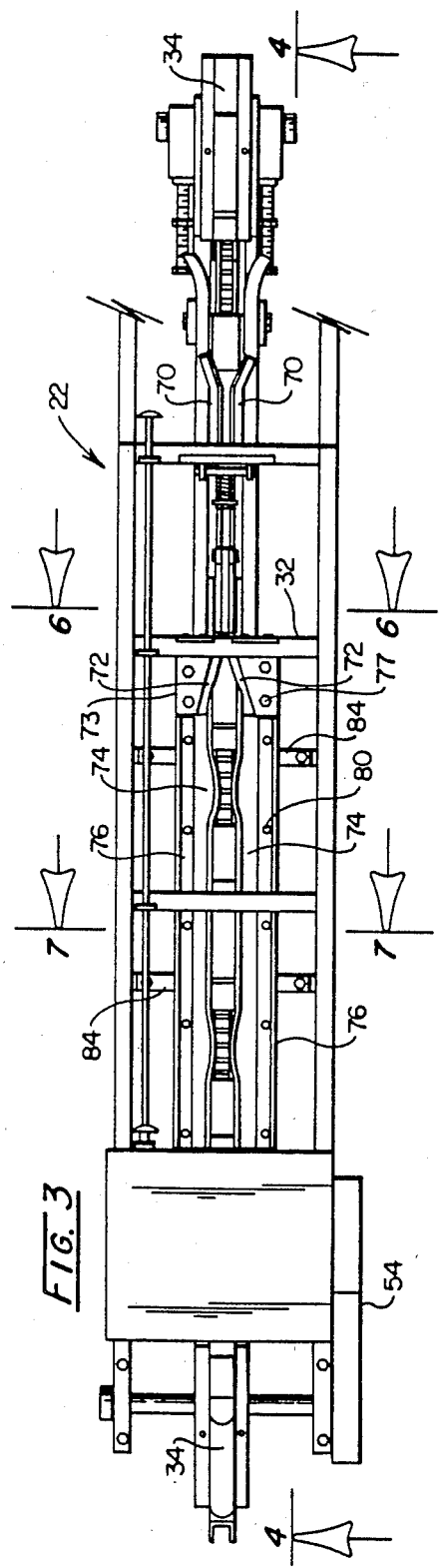
FIG. 3 is a partial top plan view of the apparatus shown in FIG. 1.

Referring specifically to FIGS. 3 and 4, each mandrel 34 is provided with a pair of prong-like projections 56 extending from the forward end portion 58 which is formed at a lower height than the middle portion of the mandrel. Prongs 56 are disposed to readily receive a hole in the breast section which is located at or near the point where each wing has been removed. A steel retaining ring 59 is fixed to the mandrel and is provided to further aid in retention of breast section on the mandrel.

Preferably, a plurality of horizontally extending ridges 60 are formed along the side portions of each mandrel 34 to aid in retaining the breast portion in a stable position during processing.

As each mandrel passes the loading station area 24, it progresses toward a cutting or slicing station. This area includes the pair of fixed, vertically disposed, closely adjacent knives 62.

Knives 62 and spacer plate 64 are mounted on a pair of brackets 66 via bolts or the like 68. Bracket 66, in turn, are fixed to the end portions of a pair of guides 70 which are fixedly mounted to the frame means 20 in a conventional manner.

Guides 70 are designed to engage a breast portion on a mandrel 34 to aid holding it in position during the initial cutting or slicing operation performed by knives 62. Knives 62 are shaped and are disposed to make a longitudinal cut the entire length of the center or keel bone of the breast section at a predetermined depth to provide an initial loose strip or flap of meat along each side of the keel bone.

As the breast section passes the knives 62 it enters an initial stripping area. This stripping or filleting area comprises a pair of inclined stripping members 72. Each member 72 is connected to an L-shaped flange 73 which in turn is fixed to a cross members 32 via bolts 77. A lower supporting plate 75 is bolted to the flange 73 to securely hold stripping member 72 between them. Each member 72 comprises a flexible strip of material extending along a predetermined length of the path of travel and are disposed to form an opening of predetermined width. The width of space between the inboard edges of each strip 72 is designed to permit the keel bone, which has been substantially exposed by the cut made by knives 62, to pass through the opening formed. However, the meat portion is engaged by the flexible stripping members. As the mandrel and breast section passes stripping members 72, the initially loosened flap of meat on each side of the keel bone is made larger by the engagement with member 72. The effective action of this engagement is to "peel" or strip the meat portion downwardly away from the underlying supporting bone structure. This bone structure is essentially the rib section of the breast. The angle of inclination of stripping members 72 is predetermined relative to the general configuration of the breast to begin the stripping action from a point generally closely adjacent to the keel bone and progress downwardly along the rib portion of the poultry breast.

The breast portion next engages a similar pair of stripping members 74 which are inclined at a less severe angle than members 72. The angle of inclination is predetermined to gradually peel the remaining meat portion from the bone structure to form a one-piece fillet of breast meat.

This elongated stripping section is formed by an upper retaining member 76 and a lower retaining member 78 bolted to one another at spaced locations such as at 80. Stripping members 74 are secured between these upper and lower retaining members. A plurality of braces are provided such as at 82, fixed in any conventional manner to support members 32. Braces 82 are bolted to flange members, such as 84, which in turn are fixed to upper retaining member 76 to support the retaining members 76 and 78 and stripping members 74 in their predetermined position.

As the breast section disposed on a mandrel 34 reaches stripping members 74 wherein the opening or space between the inboard ends is larger than the opening between stripping members 72, the stripping or filleting action is continued. The gradual angle of inclination along the pathway formed by stripping members 74, in combination with the movement of the mandrel, effectively peels the meat portion downwardly away from the supporting bone structure until each meat fillet is stripped from the underlying bone at the terminal end of the stripping members 74. The meat fillets from each side fall downwardly to either a receptacle, such as 86, or preferably to a conveyor, not shown, to be carried away in a continuous process.

The remaining bone portion of the stripped breast section is carried by mandrel 34 to the bone discharging section indicated generally at 52, which comprises an endless chain 88 mounted on a pair of sprockets 90 carried on shafts 92. One of the shafts 92 is conventionally connected to the driving shaft of motor 50. The size of the sprockets 90 is chosen such that endless chain 88 has a faster lineal speed than chain 36 carrying mandrel 34.

A plurality of sharp projections 94 are fixedly mounted on chain 88 to engage the stripped breast section. Since chain 88 is traveling at a faster lineal rate, the stripped breast sections are effectively thrown forwardly off the mandrel 34 as it engages the sharp projections 94. Preferably a conventional conveyor system, not shown, may be disposed to catch these stripped bone portions falling from the end of the path of travel for separate disposal.

In operation, an operator places a pre-cut poultry breast section on the mandrel 34 which is moving through the loading area indicated generally at 24. The manner of loading is easily accomplished by inserting each prong 56 through a hole created by the prior removal of the wings from the breast section.

Figure 6:
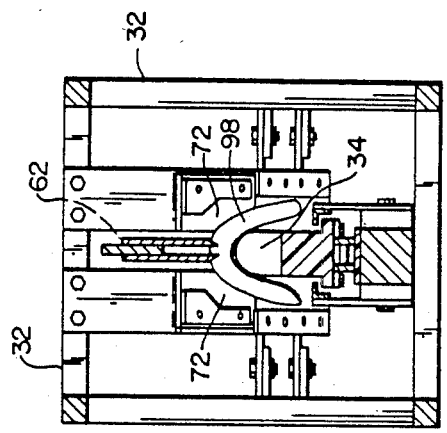
FIG. 6 is an end elevational view, in section, of a portion of the apparatus shown in FIG. 1, the section being taken along line 6—6 in FIG. 3.

The outer portion of the breast is upwardly facing as the breast section approaches cutting knives 62 as best seen in FIG. 6.

As described earlier herein, knives 62 are disposed to make a cut along the entire length of the breast closely adjacent to the length of the keel bone as the mandrel 34 and breast section 98 pass under knives 62.

The cut made by the knives 62 is designed to create a loose strip of meat parted from the keel bone so that as the breast section continues moving into contact with the resilient stripping members 72, the resistance caused by the engagement between the loose flap of meat and stripping members 72 begins to peel the meat from the underlying bone section. The angle of inclination of stripping member 72 is designed to progressively peel the meat away from each side of the breast in a downward direction.

Figure 7:
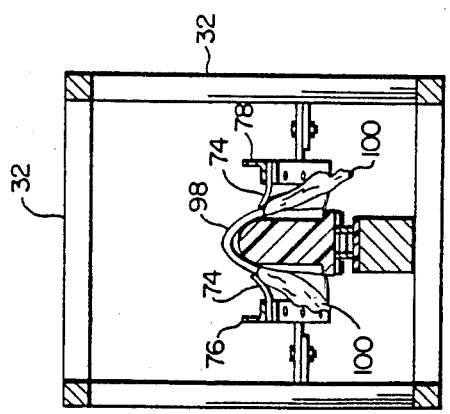
FIG. 7 is an end sectional view similar to FIG. 6, the section being taken along line 7—7 in FIG. 3.

After passing stripping members 72, a much larger strip of loosened meat is next presented to the longer section formed by stripping members 74 which begin at a similar elevation relative to the downstream end of stripping members 72 to assure that the stripping or peeling action continues in a complete and progressive manner. The gradual slope or inclination of the path formed by stripping members 74 provides for a continuing downwardly progression of the stripping action to effect very efficient removal of the meat fillet 100, as seen in FIG. 7, from each side of the breast section 98.

The meat fillets are removed in a single piece from each side of the breast and fall to a collecting system mounted under and near the terminal end of stripping members 74. The bone portion from which the meat has been removed is discharged as described earlier herein.

The cycle is repeated in a continuous process as the operator loads each mandrel as it passes the initial loading area.

The apparatus is of relatively simple construction and is designed to permit relatively easy cleaning by conventional food sanitation equipment in a relatively rapid fashion to lessen any required down time.

The removal of the meat fillets may be done with or without the prior removal of the skin from the breast section.

It is also important to point out that the resiliency or flexibility of the material employed for stripping members 72 and 74 is important to assure proper removal of the maximum amount of meat without breaking or tearing of the underlying bone sections.

It has been found that a synthetic rubber material having a durometer rating between approximately 75 to 95 with the preferred range of 80 to 90 provides excellent results.

If the material is too soft or flexible, the yield is severely decreased with a high degree of failure to peel the meat from the bone. If it is too stiff, the underlying bone tends to break and tear off and be carried away with the meat.

Either of these results will result in an unsatisfactory product for the industry.

Utilizing a synthetic rubber material having the preferred range of durometer rating of 80 to 90, has been demonstrated to consistently provide yields of 54 to 56 percent on pre-skinned breast sections with no observed tendency to carry along unwanted bone fragments.

The preferred speed of the apparatus has been between 15 to 20 breast sections per minute. This represents a five to six fold increase over a typical manual operation.

Another embodiment of the present invention is illustrated in FIGS. 8-11. Most of the features of this embodiment are essentially identical or similar to those shown in the embodiment of FIGS. 1-5.

The primary difference in the embodiment shown in FIGS. 8-11 relates to a modification of the stripper members 72 and 74 shown in the first described embodiment. The modification relates to an overall shortening of the stripping or filleting area and therefore provides an overall reduction in length of the apparatus. This offers a space-saving feature which is particularly important in production plants where floor space is limited. Other features of the modified strippers members will be described later herein.

Those portions of the apparatus shown in FIGS. 8-11 which are essentially identical to corresponding portions in the embodiment of FIGS. 1-7 are identified by the same reference numeral. Those portions which have been modified will be referred to using the same reference numeral as the corresponding portion of the embodiment of FIGS. 1-7 and further identified by the letter a.

For purposes of brevity and to reduce repetition, portions of the embodiment in FIGS. 8-11 which are conventional apart from the present invention and which have been previously described in relationship to the earlier described embodiment will not be described in detail again with respect to this embodiment.

Referring to FIGS. 8-11, the embodiment illustrated includes a base means, indicated generally at 20a, which provides support for a horizontally extending upper frame section 22a. Frame section 22a is disposed essentially in a horizontal plane along which an endless chain 36 travels. In this embodiment, there is no vertical inclination from front to rear such as provided in the embodiment of FIGS. 1-5.

Endless chain 36 is otherwise conventionally mounted to the frame and carries mandrels 34 to propel the mandrels in a spaced relationship along a path from the loading zone 24 to the unloading zone 26 in a similar manner as previously described.

A conventional electric motor, indicated generally at 50, is similarly provided and operatively connected to conventional gearing and/or a sprocket arrangement to drive the endless chain 36 and the bone discharging apparatus, indicated generally at 52, which was described in the embodiment of FIGS. 1-7.

As a mandrel 34 leaves the loading station or area 24 and approaches the cutting station, a poultry breast mounted thereon, is engaged by a pair of guides 70a. Similar to guides 70, guides 70a are designed to aid holding the breast portion in a stable position on the mandrel 34 during the initial cutting operation performed by a pair of knife means 62a.

Similar to the previously described embodiment, knife means 62a are shaped and disposed to make a longitudinal cut along the entire length of the keel bone of the poultry breast along each side of the keel bone.

Figure 9:
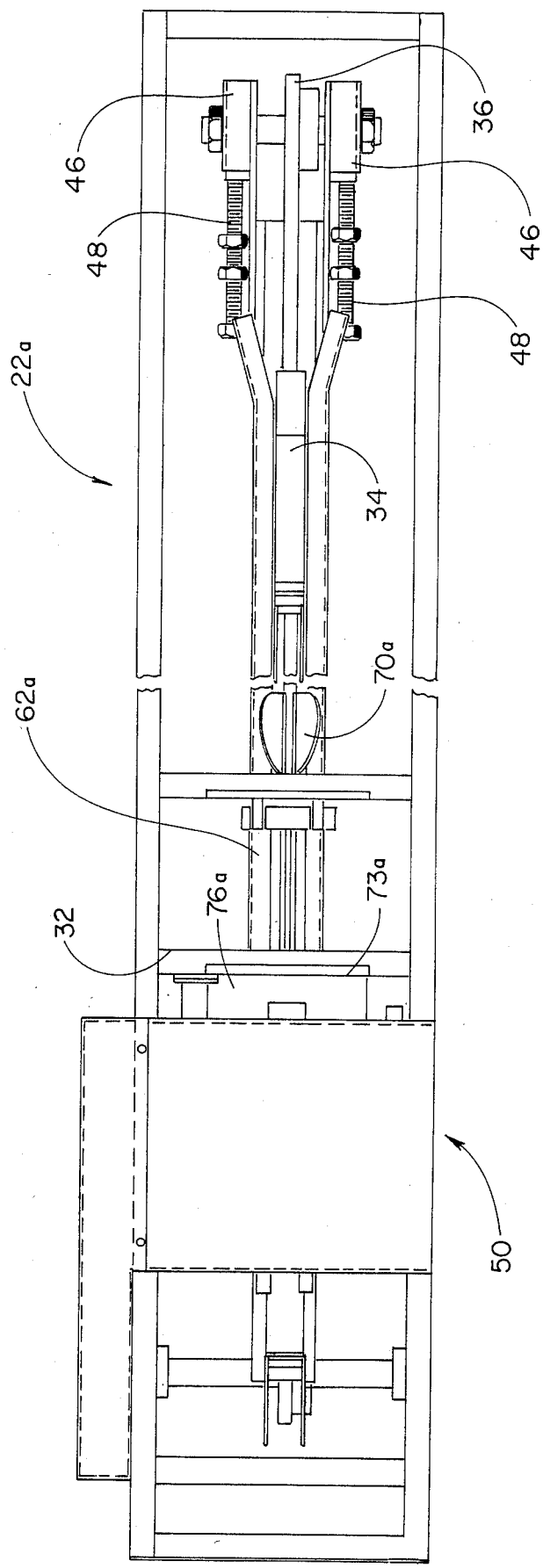
FIG. 9 is a top plan view of the apparatus shown in FIG. 8.
Figure 11:
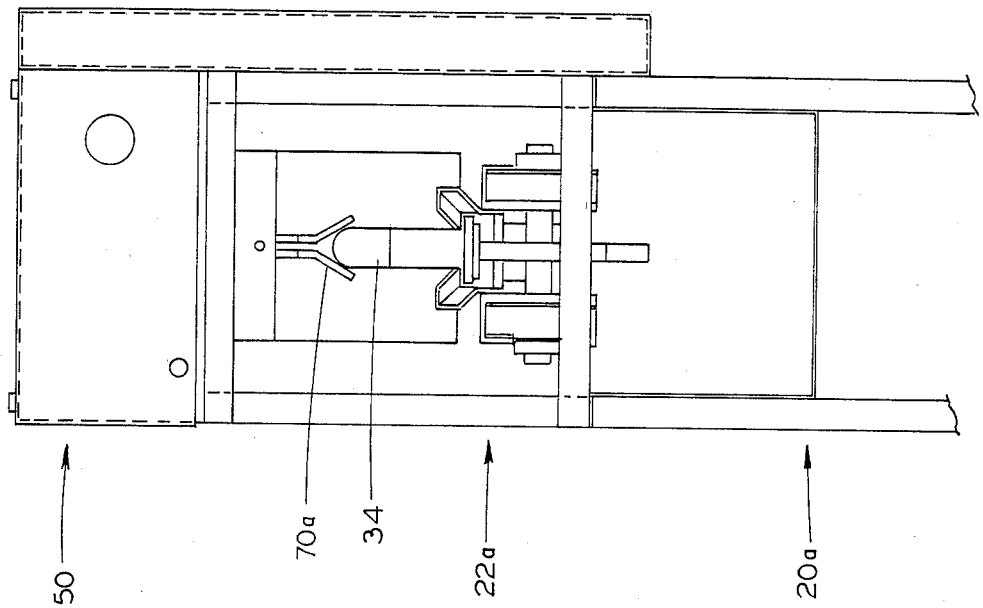
FIG. 11 is a right elevational view of the apparatus shown in FIGS. 8 and 9.
Figure 10:
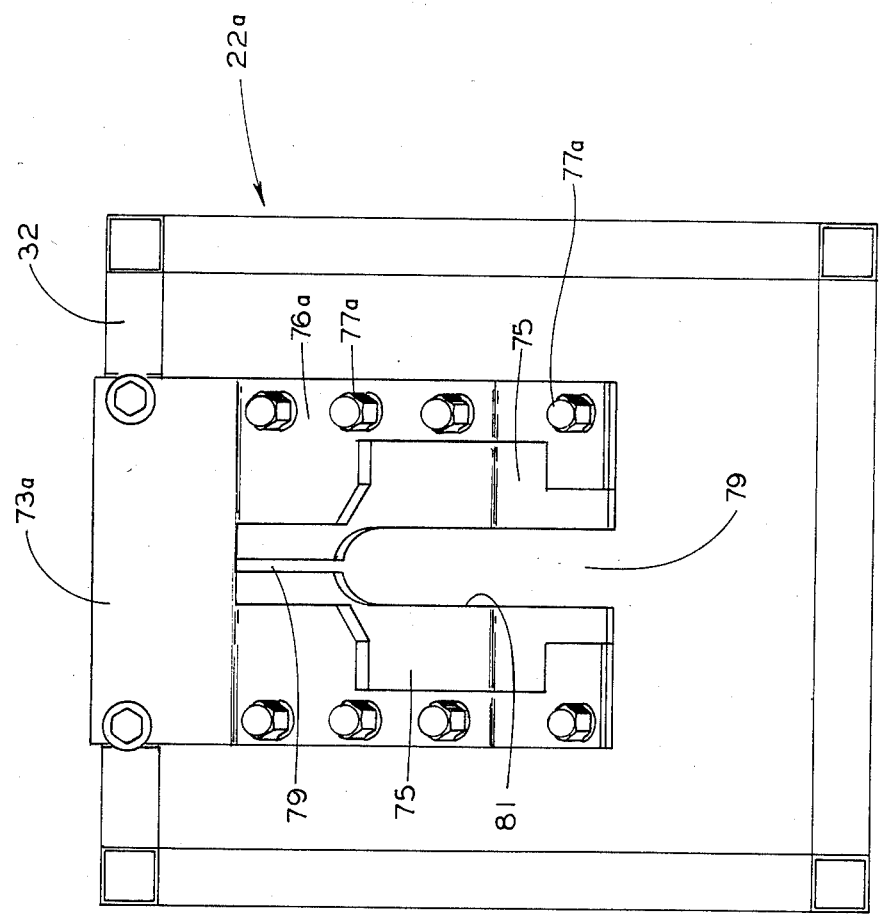
FIG. 10 is a left elevational view of a portion of the apparatus shown in FIG. 8 illustrating the stripper members apart from the remainder of the apparatus.

After the longitudinal cuts are made, the breast section on a mandrel 34 enters the stripping area. Here a pair of stripping members 72a are provided which are secured to frame 22a via retaining plates 76a and 78a. Plate 76a is provided with a vertically disposed flange portion 73a which is bolted to a horizontal frame member 32, as best seen in FIGS. 6 and 9.

Each of the stripper members 72a is mounted between retaining plates 76a and 78a which are securely bolted together via bolts 77a thereby fixing the position of the stripper members 72a wherein a laterally extending surface portion 75 extends inwardly and terminates in an edge portion 81 to form a predetermined slot or opening 79 which extends longitudinally relative to the direction of travel of mandrel 34.

This aspect of the stripper members is the same as in the embodiment of FIGS. 1–7. Further members 72a comprise a flexible strip of the identical material as previously described relative to the embodiment of FIGS. 1–7.

Additionally, each stripper members 72a is disposed in a vertically inclined relationship relative to the longitudinal direction of travel of the mandrels 34 such that the breast section carried on a mandrel 34 progressively engages the inclined inner edge portions of stripper members 72a as the breast is carried along the path of travel of each mandrel 34. In effect, engagement of the breast section with the stripper members results in a downwardly and rearwardly directed force on the breast section as the mandrel moves along the chain 36.

Stripper members 72a are modified relative to stripper members 72 and 74 in the earlier described embodiment relative to the degree of vertical inclination. The upper portion of the slot 79 is more narrow than the lower portion as best seen in FIG. 9. The upper portion of opening 79 is similar in width to the opening between the first pair of stripper members 72 in the earlier described embodiment. The lower portion of opening 79 is similar in width to the opening formed between stripper members 74 of the earlier described embodiment.

The vertical inclination of the stripper members 72a is similar to that formed by stripper members 72 except for a terminal end portion which is of greater downward inclination.

Stripper members 72a essentially combine both functions of the combined stripper members 72 and 74 of the first described embodiment, however, they provide a significantly foreshortened path during which the meat is peeled from the breast section. This permits the overall length of the embodiment of FIGS. 6–9 to be less than the length of the embodiment of FIGS. 1–7.

Further, the average vertical angle of inclination of the slot or opening 79 relative to the path of travel of the breast sections is somewhat greater during the meat removal process compared to the earlier described embodiment. Therefore the force applied by the stripper members is directed relatively in a more rearward as well as the vertically downward direction as the breast section travels through the stripper section.

As a breast portion which has passed through the cutting section first engages the stripper members 72a, the most forward and upper portions are engaged by the portions of stripper members 72a forming the more upperwardly disposed and narrow portion of opening 79. The resilient engagement between the undersides of the inner lateral surfaces 75 and the terminal edges 77 of stripper members 72a and the loosened flap of meat created by the cutting section causes the meat portion to be pulled downwardly and rearwardly from the breast section in a progressive fashion in a generally similar manner as shown in FIG. 7.

Continued movement of the breast section and mandrel 34 causes the enlarged loosened flap of meat on each side of the keel bone to be engaged with the portion of stripper members 72a forming the wider portion of opening 79. The peeling action is then continued in a vertically downward and in a rearwardly directed manner. As the breast moves forward the now larger loosened flap of meat on each side then engages the terminal end portion 114 of stripper members 72. Since this portion has a greater vertical inclination than the upper portions, the relative forward movement of the breast section creates an increased horizontal component of force to be applied in the stripping action which results in a more pronounced rearwardly peeling effect upon the flap of meat being removed and effectively separates the whole flap of meat from the bone structure of the breast section as the breast section leaves the stripping area.

The overall effect of the modified stripping members 72a is to introduce a more compact construction which effectively peels the meat away from the bone of the breast section over a shorter time interval and yet in a manner which does not tend to break or rip the underlying rib bones. This is accomplished by the combined progressively downward and horizontally rearward action of separating the meat from the bone which tends to follow more closely the longitudinal countour of the rib bones of the breast section.

The increase in downward inclination of the lowest portion of stripper members 72a provides an increased horizontal component of force in combination with a lesser downward component of force to significantly reduce if not essentially eliminate the tendency to tear or break the relatively fragile end portions of the rib bones during the meat removal process which then might be carried off with the meat portion.

The stripped breast sections are removed from the mandrel in the same manner as previously described relative to the first embodiment by the action of bone discharge section 52.

The meat portion and the bone portion are similarly separately collected for further processing.

In view of the foregoing description, it should be apparent that the present invention provides an apparatus and method for filleting the meat from poultry breast sections in a fast, efficient and safe manner and represents a very significant advance in the poultry processing art. Production rates are dramatically increased and high yields are consistently obtained. Compared to manual cutting methods, worker safety is obviously increased very significantly.

What is claimed is:

1. An automatic apparatus for separating the meat from a pre-cut poultry breast section comprising, in combination, a base means provided with an upper, longitudinally extending support frame; a plurality of mandrels mounted in spaced relationship on an endless chain mounted on said support frame for generally parallel longitudinal movement along said frame, said mandrels adapted to receive a poultry breast section with the meat portion facing upwardly; retaining guide means mounted on said support frame above a portion of the path of travel of said mandrels for force-transmitting engagement with a poultry breast section mounted on said mandrels; a pair of knife means longitudinally disposed on said frame means along the path of travel of said mandrels for engagement with a poultry breast portion along each side of the keel bone in said breast portion retained upon one of said mandrels; a pair of resilient stripper members mounted on said frame means adjacent to the downstream end of said knife means and extending longitudinally along the path of travel of said mandrels, each of said members including a laterally extending surface terminating in an inner edge portion extending toward one another and defining between said edge portions a longitudinally extending opening of predetermined width aligned to receive the keel bone portion of a breast section mounted on said mandrels and having a progressively downward vertical inclination relative to the path of travel of said mandrels, the inner edge portions of said stripping members disposed for yielding force-transmitting engagement with the approximate point of junction between the meat and bone portions of said breast sections to forcibly separate the meat from the bone portion as the breast section on said mandrel advances along said opening; and means to separately collect the meat and bone portions after separation has occurred.

2. The apparatus defined in claim 1 wherein said resilient stripping members comprise a synthetic material having a degree of flexibility equivalent to a material with a durometer rating in the range of approximately 75 to 95.

3. The apparatus defined in claim 2 wherein said durometer rating is between approximately 80 to 90.

4. An apparatus for automatically removing the meat from a pre-cut poultry breast section comprising, in combination, a support frame; a plurality of mandrels, each adapted to receive a poultry breast section in a releasably fixed position and movably mounted on said frame to travel a longitudinal path along said frame; knife means mounted on said frame and disposed to effect a longitudinal cut in the meat portion of a breast section adjacent to and along the length of the keel bone of said breast section; a pair of stripper members mounted on said frame at a downstream position relative to said knife means, said members including a laterally extending surface terminating in an inner edge portion spaced from one another to form a longitudinal opening between said edge portions, said opening having a longitudinal centerline approximately aligned to receive the keel bone of a breast section mounted on a mandrel as it passes through the length of said opening and a vertically downward inclination relative to the path of travel of said mandrels, the inner edge portions of said stripper members engaging an advancing breast portion on a mandrel to exert a progressively downward and rearward force upon said meat portion to separate the meat portion from the underlying bone portion of said breast section; and means for separately collecting the removed meat portions and the bone portions.

* * * * *